Patented Sept. 27, 1949

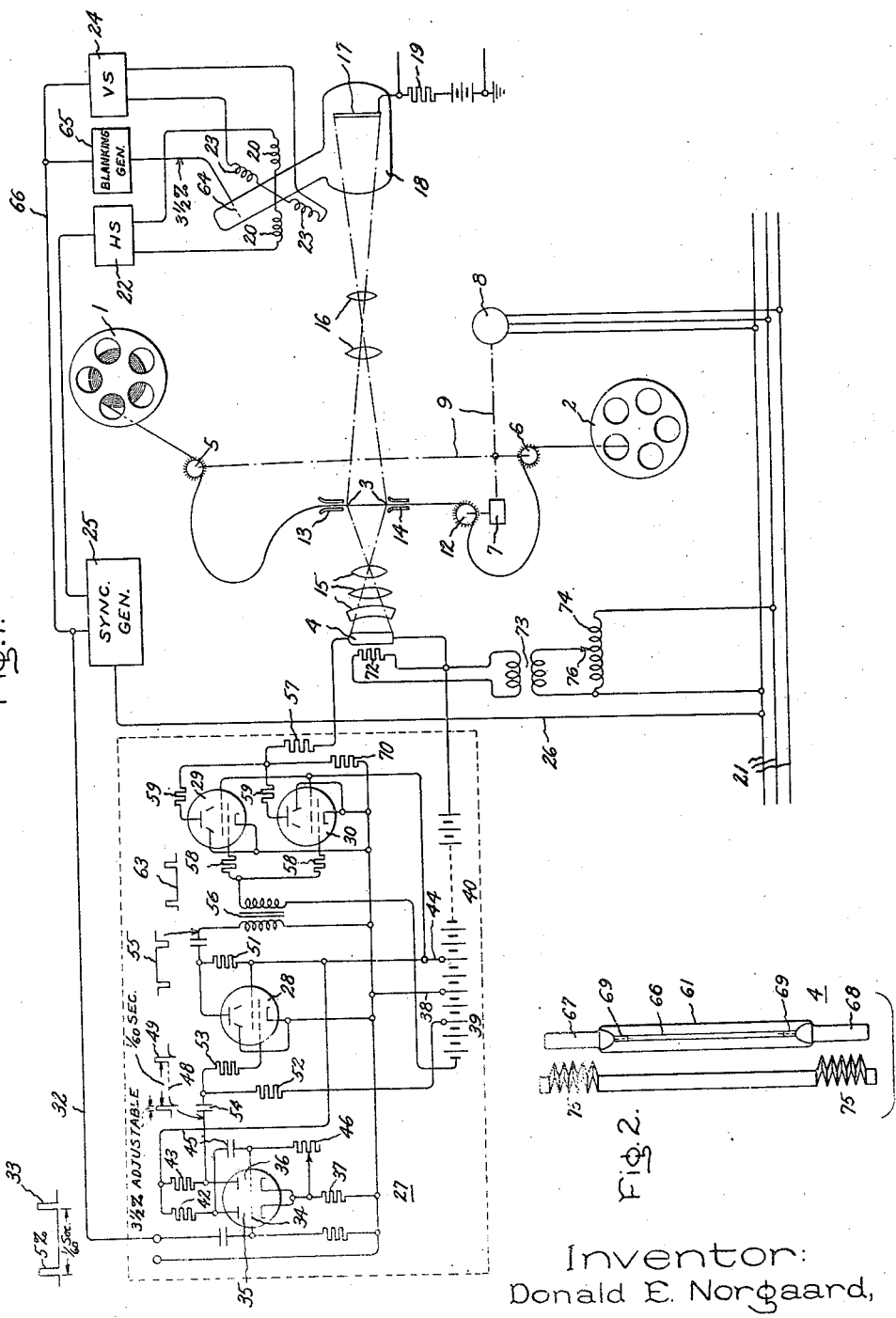

2,483,149

UNITED STATES PATENT OFFICE 2,483,149

TELEVISION FILM PROJECTION WITH SYNCHRONIZED DISCHARGE LAMP

Donald E. Norgaard, Scotia, N. Y., assignor to General Electric Company, a corporation of New York Application March 13, 1946, Serial No. 654,133

4 Claims. (Cl. 178—7.2)

1

My invention relates to motion picture projection systems and more particularly to television systems for transmitting pictures from motion picture films.

One of the objects of my invention is to provide improved illumination of the motion picture film and cathode ray camera tube in such systems.

A further object of my invention is to secure this advantage while obviating the use of shutters for control of the light.

A further object of my invention is to provide improved means to produce intense pulses of light for transmission through the film to the camera tube in desired synchronous relation with the operation of the deflection system of the camera tube.

The novel features which I believe to be characteristic of my invention are set forth with particularity in the appended claims. My invention itself, however, both as to its organization and method of operation together with further objects and advantages thereof, may best be understood by reference to the following description taken in connection with the accompanying drawing in which Fig. 1 represents an embodiment of my invention and Fig. 2 represents a detail thereof.

Referring to Fig. 1 of the drawing, I have illustrated therein a motion picture projection apparatus in which a motion picture film is, during operation of the apparatus, wound from a reel 1 onto a reel 2 passing in its travel between the rolls, an aperture 3 where light is transmitted through it by means of a lamp 4. The film is driven by means of sprockets 5 and 6 and the intermittent drive mechanism 7. The sprockets 5 and 6 and the intermittent drive mechanism 7 are connected for operation by means of a synchronous motor 8 as indicated by the dash lines 9. The intermittent drive mechanism 7 comprises a sprocket 12 which operates intermittently to pull the film in step by step fashion through pressure shoes 13 and 14. These pressure shoes each comprise a pair of members on opposite sides of the film to guide it across the aperture 3. Preferably, one of each of these pairs of members is fixed in position and the other spring pressed against the film to produce a certain amount of friction thereon, thereby to keep the film taut across the aperture 3 and to hold it into position when the film is stopped. This mechanism and the intermittent drive mechanism 7, 12 are conventional in motion

2 picture apparatus and require no further explanation.

Light from the lamp 4 first passes through appropriate condensing lenses 15, thence through the film and aperture 3 and further lenses 16 to, in the equipment illustrated, the photo-sensitive area 17 of a television camera tube 18. All of the apparatus between the lamp 4 and the camera tube is the conventional apparatus commonly used in motion picture television projection equipment and differs therefrom only in that the shutters commonly used are omitted.

The camera tube 18 may be the usual cathode ray type commonly referred to as iconoscope. The photo-sensitive surface 17 comprises elemental areas which become electrically charged when light falls thereon to an extent dependent on the intensity of the light. When the cathode ray of the tube impinges on the elemental areas, such areas discharge producing a current in the resistance 19 of intensity dependent upon the degree of light to which the elemental area is subjected. The voltage from this resistance 19 may be supplied to the conventional television transmitter for transmission in the usual well known way.

The cathode ray of the camera tube 18 is provided with horizontal deflection coils 20, which are supplied with essentially saw tooth current waveforms from horizontal deflection generator 22. The cathode ray is also deflected with vertical deflection coils 23 which are supplied with essentially saw-tooth current wave forms produced in a vertical deflection generator 24. The vertical deflection generator preferably produces a wave having a frequency of 60 cycles per second and is synchronized from a pulse generator 25. The horizontal sweep generator 22 operates at a much higher frequency, as for example 15,750 cycles per second, and is likewise controlled in frequency and in its time phase relation by the synchronizing pulse generator 25. This synchronizing pulse generator 25 is supplied with synchronizing voltage over a conductor 26 from a 60-cycle, 3-phase source 21 from which the synchronous motor 8 is supplied thereby to synchronize the sweep voltages supplied to the cathode ray device 18 with the intermittent motion of the film across the aperture 3.

At the left-hand portion of the drawing are shown circuits for energizing the lamp 4 to project intense pulses of light through the aperture 3 during the intervals when the film is stationary therein. This apparatus, in the form illustrated, comprises a multi-vibrator 27 and vacuum tubes 28, 29 and 30, the latter two being connected essentially in parallel and in series with the lamp 4. This equipment is synchronized from the synchronizing pulse generator 25 which supplies over conductor 32 a square wave of the form indicated at 33. This square wave is also supplied over conductor 31 to the vertical sweep generator 24 to synchronize the output of that generator. This wave comprises square pulses occuring at the frequency of source 26 and the vertical sweep or at 60 cycles per second, the pulses having a duration equal to about 1/20 of the period of the pulse wave.

These pulses are supplied to the grid 34 of the multi-vibrator 27. This multi-vibrator comprises a pair of electron discharge devices 35 and 36, each having an anode, a cathode and a control electrode. The cathodes of the discharge devices are connected together and through a resistance 37 to a point 38 between two sources 39 and 40 of operating potential. The anodes of the two discharge devices are connected through respective resistances 42 and 43 to a positive terminal 44 on source 40. The anode of device 35 is connected through condenser 45 to the control electrode of discharge device 36, which in turn is connected to the cathode through adjustable resistance 46.

Current normally flows through the right-hand discharge device 36 and resistance 37. The voltage produced on resistance 37 by this current is sufficient to drive the left-hand cathode sufficiently positive with respect to grid 34 to prevent the flow of current in device 35. Thus, the anode of this device is at a high positive potential. Since the grid of device 36 is at cathode potential, condenser 45 is normally charged.

When a positive pulse, indicated at 33, is supplied to grid 34, device 35 becomes conducting and its anode potential drops. Since the charge in condenser 45 does not change rapidly, the grid of device 36 is driven negatively thereby interrupting the current in device 36. This condition remains, however, only until the charge on condenser 45 leaks off to a sufficient extent to permit current again to start its flow in device 36. When this happens the potential developed across resistor 37 drives the left-hand cathode sufficiently positive with respect to grid 34 to reduce the current in discharge device 35, the action being, of course, accumulative until stable conditions are reached wherein device 35 is completely non-conducting and device 36 is conducting its normal amount of current.

In this way the multi-vibrator 27 produces on resistance 43 a pulse wave such as that indicated at 48, this wave having positive pulses 49 of a duration equal to approximately 3½% of the period of the pulse wave. The duration of these positive pulses is adjustable to a certain extent by a variation of resistance 46.

Device 28 operates as an amplifier and clipper of these pulses. Its cathode is connected to the point 38 and its anode is connected through resistance 51 to the point 44. Its control electrode is connected through resistance 52 to a point on source 39 sufficiently negative with respect to the cathode to prevent the flow of current therein. A parasitic resistance 53 is connected in the grid circuit to prevent undesired parasitic effects.

The wave 48 is supplied to the control electrode of device 28 through coupling condenser 54 and is reproduced upon the primary of transformer 56 in the form indicated at 55, the wave 55 comprising negative pulses of square wave shape. The secondary winding of transformer 56 is connected between the control electrodes of devices 29 and 30, which are connected together, and a negative point on the source 39. The anodes of devices 29 and 30 are connected together and through resistance 57 and lamp 4 to the positive terminal of the source 40. Preferably, the source 40 is one of about 2,000 volts thereby placing a high positive potential on the anodes of devices 29 and 30, the cathodes of which are connected to point 38. The screen grids of these devices are connected together and to the point 44.

These devices 29 and 30 are preferably of high current carrying capacity to pass large current through the lamp 4 during the pulse periods. Parasitic resistances 58 are included in each of the grid leads and further parasitic resistances 59 are connected in each of the anode leads.

Transformer 56 is of such design that the pulse wave 55 is reproduced on the secondary winding in the form indicated at 63 comprising positive pulses of square wave shape and of the same duration as the pulses of wave 48. These pulses overcome the high negative bias on these grids provided by source 39 which may be of 400 volts and cause devices 29 and 30 to pass current to practically the full extent of their cathode emission thereby passing large current through resistance 57 and the lamp 4. Thus, the lamp 4 produces an intense light pulse of the duration of the positive pulses of the wave 48 produced by the multi-vibrator, these pulses, of course, illuminating the film at aperture 3 and the photosensitive surface 17.

It is desired that these light pulses fall upon the photo-sensitive area 17 at a time when the cathode ray is interrupted or blanked out. Preferably this light falls upon the screen during the blanking period, or retrace interval, of the vertical sweep produced by the vertical sweep generator 24. That is, the ray is deflected gradually downward over the area 17 during the line scanning produced by the horizontal sweep generator 22. It is then blanked out, or interrupted, and returned to the starting point. The light pulse is produced during this interval when the cathode ray is blanked out. The cathode ray is interrupted during this time by means of a pulse supplied to control electrode 64 of the cathode ray tube by means of a blanking pulse generator 65 synchronized over conductor 31 from the synchronizing pulse generator 25.

This blank interval may have a duration of from 5 to 8 per cent of the vertical scanning period which is 1/60 of a second. The positive pulses of the wave 33 which occur during this interval may have a duration of about 5% of the vertical sweep period. The positive pulses of the wave 48 produced by the multi-vibrator have a duration of only 3½% of this period, the duration of these pulses being adjustable by variation of resistance 36 to maintain the pulses of light entirely within the blanking interval of the vertical sweep so that the photo-sensitive area 17 is not illuminated during any portion of its scanning period.

These light pulses of course occur only when the film is stationary in aperture 3, the pulse equipment 35, 36, 28, 29, 30 being synchronized for that purpose with the intermittent drive 7 through source 21 and synchronous motor 8.

During this interval, when light falls on the elemental areas of the surface 17, the elemental areas become charged to a degree dependent upon the intensity of the light falling on the respective elemental areas, this, of course, being dependent upon the photographic density of the film at aperture 3 and thus varying over the photo-sensitive area in accord with the picture to be transmitted. These charges are retained by the respective elemental areas of the surface 17 until the cathode ray impinges thereon during the line scanning when such areas are discharged, this producing corresponding current in resistance 19. This line scanning reconditions the area for recharging during the next vertical blanking or retrace interval at which time source 4 produces another intense flash of light in accordance with wave 63.

Commonly in the past the light falling upon the area 17 has been interrupted mechanically by means of shutters operated in synchronism with the film drive mechanism and with the vertical sweep of the cathode ray tube. It has been found, however, that my invention not only has the advantage that it obviates the use of the mechanical shutters and the synchronizing mechanism therefore, but it affords means whereby the light pulses impinging on the area 17 may have far greater energy content than it was practicable to produce by means of a system employing mechanical shutters. This is because the time required for operation of the shutters is such that ordinarily they cannot be fully opened and closed quickly enough to permit transmission therethrough of a large portion of the light generated by a conventional light source. Moreover, since the conventional source of light is operated continuously, it was necessarily operated at lower intensity than is practical when intermittent operation is employed. In my invention the current passed by the lamp is about ten times greater than could be passed continuously thereby producing pulses of far greater intensity than could be obtained were the lamps operated continuously.

In my system not only may the light source be of greater intensity than would be practical were it continuously operated but the light pulses being substantially rectangular have substantially their full intensity during the entire duration thereof. That is, the light pulses are both initiated and terminated substantially instantaneously. Moreover, the light pulses produced by my system may be substantially longer relative to the vertical blanking or retrace interval than is practical with the operation of mechanical shutters. Such shutters, being operated by a synchronous motor operating under variating conditions of load, line voltage, etc., are subject to some variation in phase of operation relative to the blanking interval and therefore the pulses produced thereby must be made shorter to assure that no part thereof occurs outside of the blanking interval. This difficulty is increased by any looseness in synchronization between generator 25 and the voltage of line 21. This difficulty is largely eliminated by my invention.

Preferably the lamp 4 is one of the mercury vapor capillary type such as is schematically indicated in Fig. 2. This lamp comprises a thick walled quartz tube 61 having capillary 66 extending between electrode 67 and 68, the latter being adapted to be received in suitable circuit terminals. Within the capillary 66 are two globules of mercury 69 producing vapor which may be ionized by current flowing between electrodes 67 and 68.

It has been found that for best operation of the lamp the vapor in the capillary 66 should be maintained in an ionized condition between the pulses of current controlled by devices 29 and 30. Such continuous ionization is effected by means of a high resistance 70 connected between negative terminal 38 of the source 40 and a suitable point on the anode circuit of devices 29 and 30 as for example the upper terminal of resistance 57. This resistance 70 may have a value of, for example, 5 megohms or such that a continuous current of approximately 0.4 milliampere flows in the lamp between the pulses. This current keeps the vapor ionized at all times and eliminates irregularity in the starting, or striking, of the arc when the devices 29 and 30 become conducting during the positive voltage pulses supplied to the grids thereof. Since this current is very small, the light produced by the pulses is correspondingly small and has no adverse effect upon the photo-sensitive area 17 during the line scanning.

It has also been found in the operation of the system that the heat generated in the lamp 4 by passage of current therethrough generally is insufficient to produce the greatest amount of light from the lamp and that more satisfactory operation is had by supplying additional heat to the lamp, and particularly to the electrodes 67 and 68 thereof. This is effected by means of a heater 72 indicated in Fig. 1 adjacent lamp 4, this heater being connected across a secondary winding of a transformer 73. The primary winding is connected through a movable tap 76 across a variable portion of an auto-transformer 74 which is excited from the power source 21.

Preferably the heater 72 is of the form indicated in Fig. 2 comprising a strip of resistance metal such as Nichrome extending parallel with the lamp and which is crimped or folded at the regions 75 near the electrodes 67 and 68 thereby to produce more heating of these electrodes than is produced in the portion of the lamp between the electrodes.

The current flowing in the gas within the discharge device is sufficient to produce adequate heating between these electrodes 67 and 68 but excess heat produced in this region by strip 72 is unobjectionable.

Alternatively I have found that the operation of the lamp may be greatly improved by blowing heated air across the lamp, as by means of a fan, although even with such means it is preferable that the heat be concentrated upon the electrodes more than upon the portion of the lamp between the electrodes.

The proper amount of heating of the lamp greatly increases the light produced thereby during the current pulses supplied thereto by the apparatus above described.

While I have shown a particular embodiment of my invention, it will, of course, be understood that I do not wish to be limited thereto since many modifications, both in the circuit arrangement and in the instrumentalities employed, may be made and I contemplate by the appended claims to cover any such modifications as fall within the true spirit and scope of my invention.

What I claim as new and desire to secure by Letters Patent of the United States is:

1. The combination, in a motion picture television projection system, of a cathode ray camera tube having a photo-sensitive area, means to deflect the ray of said tube across said area in two directions at different frequencies, means to blank said ray during the retrace interval of its deflection at the lower of said different frequencies, a motion picture film drive, a gaseous discharge lamp arranged to project light through the film driven by said drive on said area, means comprising a synchronizable pulse generator to generate short periodic control pulses at said lower frequency, means to synchronize both said pulse generator and said blanking means with said film drive, energy supply means controlled by said pulse generator to pass current pulses of high intensity through said lamp synchronously with said control pulses, and means to adjust the duration of said control pulses with respect to said blanking interval.

2. The combination, in a motion picture television projection system, of a cathode ray camera tube, having a photo-sensitive area, means to deflect the ray of said tube across said area in two directions at different frequencies, means to blank said ray during the retrace interval at the lower of said frequencies, an intermittent motion picture film drive driven by a synchronous motor, an alternating voltage supply for said motor, a discharge lamp arranged to project light through the film driven by said film drive on said sensitive area, means comprising a synchronizable pulse generator to generate short periodic control pulses at said lower frequency, means to synchronize both said pulse generator and said blanking means with said film drive, energy supply means controlled by said pulse generator to supply an intense pulse of energy to said lamp in synchronism with each of said control pulses, and means to adjust the duration of said control pulses with respect to the duration of said retrace interval.

3. The combination, in a motion picture television projection system, of a cathode ray camera tube having a photo-sensitive area, deflection means therefor, a motion picture projector comprising a film drive mechanism and a projection lamp arranged to throw light on said area, a multivibrator, means to synchronize said multivibrator and said mechanism with said deflection means, and means controlled by said multivibrator to pass intense current pulses through said lamp having duration short relative to the period of said multivibrator.

4. The combination, in a motion picture television projection system, of a cathode ray camera tube having a photo-sensitive area, deflection means to deflect the ray across said area in two directions at different frequencies, means to blank said ray during its retrace interval at the lower of said frequencies, a motion picture projector comprising a film drive mechanism and a projection lamp arranged to project light on said area, a multivibrator, means to synchronize said multivibrator and said mechanism with said deflection means, and means controlled by said multivibrator to pass intense current pulses through said lamp during said retrace intervals.

DONALD E. NORGAARD.

REFERENCES CITED

The following references are of record in the file of this patent:

UNITED STATES PATENTS

| Number | Name | Date |
| --- | --- | --- |
| 1,262,590 | Newhouse | Apr. 9, 1918 |
| 1,648,687 | Hoxie | Nov. 8, 1927 |
| 1,876,083 | Spaeth | Sept. 6, 1932 |
| 2,186,013 | Edgerton | Jan. 9, 1940 |
| 2,303,960 | Seeley | Dec. 1, 1942 |

FOREIGN PATENTS

| Number | Country | Date |
| --- | --- | --- |
| 25,539 | Australia | Dec. 3, 1935 |
| 777,409 | France | Feb. 20, 1935 |
| 502,051 | Great Britain | Mar. 10, 1939 |
| 507,146 | Great Britain | June 7, 1939 |
| 843,392 | France | July 3, 1939 |